US011256757B1

(12) United States Patent
Hsieh et al.

(10) Patent No.: US 11,256,757 B1
(45) Date of Patent: Feb. 22, 2022

(54) SYSTEMS AND METHODS FOR AUTOMATICALLY CLASSIFYING A FAULT REPORT RELATED TO A MECHANICAL ASSET

(71) Applicant: Palifer Inc., San Jose, CA (US)

(72) Inventors: Meng Hsuen Hsieh, San Jose, CA (US); Meng Ju Hsieh, San Jose, CA (US)

(73) Assignee: Palifer Inc., San Jose, CA (US)

( * ) Notice: Subject to any disclaimer, the term of this patent is extended or adjusted under 35 U.S.C. 154(b) by 0 days.

(21) Appl. No.: 17/399,032

(22) Filed: Aug. 10, 2021

(51) Int. Cl.
*G06F 16/90* (2019.01)
*G06F 16/903* (2019.01)
*G06F 40/30* (2020.01)
*G06F 16/901* (2019.01)

(52) U.S. Cl.
CPC .... *G06F 16/90344* (2019.01); *G06F 16/9027* (2019.01); *G06F 40/30* (2020.01)

(58) Field of Classification Search
CPC . G06F 16/90344; G06F 16/9027; G06F 40/30
See application file for complete search history.

(56) References Cited

U.S. PATENT DOCUMENTS

2018/0373962 A1\* 12/2018 Ye ..................... G06K 9/00369
2019/0155916 A1\* 5/2019 Huang ................. G06F 16/248

\* cited by examiner

*Primary Examiner* — Log Tran
(74) *Attorney, Agent, or Firm* — Cognition IP, P.C.; Edward Steakley

(57) ABSTRACT

A plurality of object names and a query string are defined. A first set that includes a plurality of first query string-object name pairs is generated based on the plurality of object names and the query string. A closeness score is determined for each first query string-object name pair in the first set. A second set that includes a plurality of second query string-object name pairs is generated, wherein the second query string-object name pairs are selected from the first set based on the closeness scores. A measure of semantic similarity is determined for each second query string-object name pair in the second set. A third set of third query string-object name pairs is defined, wherein the third query string-object name pairs are selected from the second set based on the measures of semantic similarity.

13 Claims, 12 Drawing Sheets

"I think engine piston 1 spark plug 2 is broken." — 800

FIG. 8

SYSTEMS AND METHODS FOR AUTOMATICALLY CLASSIFYING A FAULT REPORT RELATED TO A MECHANICAL ASSET

TECHNICAL FIELD

This specification relates generally to automated data classification, and more particularly to systems and methods for automatically classifying a fault report relating to a mechanical asset.

BACKGROUND

Companies and organizations that own or manage large numbers of mechanical assets spend a great deal of time and expense monitoring and maintaining the assets. These organizations include those which own or manage fleets of vehicles and organizations with large numbers of mechanical devices located in factories and plants. Maintaining large numbers of mechanical assets requires regularly monitoring the condition of the assets. For example, a large organization with a fleet of vehicles must assign one or more employees to periodically examine the vehicles for mechanical problems.

Typically, the persons responsible for monitoring mechanical assets generate reports (sometimes known as maintenance reports or fault reports) identifying a component of an asset and an observed problem. Fault reports are received from multiple operators and aggregated together, and are subsequently reviewed, prioritized and acted upon. A person responsible for handling the fault reports reviews each fault report received and matches the fault report to a corresponding component of a corresponding asset. However, in many cases, in order to identify the component that matches the information in the report, the person must manually find the component on a component list. Many organizations maintain component lists in the form of asset trees that have thousands of nodes, and the responsible person must manually select the component path on the asset tree that corresponds to the reported issue. Consequently, the process of manually sorting large numbers of fault reports can be very time consuming (and costly).

SUMMARY

In accordance with an embodiment, a method of automatically classifying a query string is disclosed. A plurality of object names and a query string are defined. A first set that includes a plurality of first query string-object name pairs is generated based on the plurality of object names and the query string. A closeness score is determined for each first query string-object name pair in the first set. A second set that includes a plurality of second query string-object name pairs is generated, wherein the second query string-object name pairs are selected from the first set based on the closeness scores. A measure of semantic similarity is determined for each second query string-object name pair in the second set. A third set of third query string-object name pairs is defined, wherein the third query string-object name pairs are selected from the second set based on the measures of semantic similarity. One or more query string-object name pairs may be selected from the third set as the final matching pairs.

In one embodiment, each object name is a name of a component of a mechanical asset.

In another embodiment, defining a plurality of object names further includes receiving a list of assets that includes the plurality of object names organized in a tree structure, and modifying the list of assets to generate a list including the plurality of object names without the tree structure.

In another embodiment, defining a query string further includes receiving a string of text from a user and cleaning the string of text.

In another embodiment, generating a first set that includes a plurality of first query string-object name pairs further includes generating a first set including all possible query string-object name combinations based on the plurality of object names and the query string.

In another embodiment, determining a closeness score for each first query string-object name pair in the first set further includes applying to each query string-object name pair in the first set an approximate string matching technique to generate a respective closeness score for the respective query string-object name pair.

In another embodiment, defining a second set that includes a plurality of second query string-object name pairs further includes including in the second set all query string-object name pairs having a closeness score that equals or exceeds a predetermined level.

In another embodiment, determining a measure of semantic similarity for each second query string-object name pair in the second set further includes applying to each query string-object name pair in the second set a semantic matching language model to generate a measure of semantic similarity for the respective query string-object name pair.

In another embodiment, the semantic matching language model includes a language model based on the open-source Bidirectional Encoder Representations from Transformers (BERT) architecture published by Google AI.

In another embodiment, defining a third set of third query string-object name pairs further includes ranking the query string-object name pairs in the second set based on the measures of semantic similarity and selecting the N highest-ranked query string-object name pairs.

In accordance with another embodiment, a non-transitory computer readable medium has stored thereon software instructions that, when executed by a processor, cause the processor to perform a series of operations including defining a plurality of object names, defining a query string, generating a first set that includes a plurality of first query string-object name pairs based on the plurality of object names and the query string, determining a closeness score for each first query string-object name pair in the first set, defining a second set that includes a plurality of second query string-object name pairs, wherein the second query string-object name pairs are selected from the first set based on the closeness scores, determining a measure of semantic similarity for each second query string-object name pair in the second set, and defining a third set of third query string-object name pairs, wherein the third query string-object name pairs are selected from the second set based on the measures of semantic similarity.

These and other advantages of the present disclosure will be apparent to those of ordinary skill in the art by reference to the following Detailed Description and the accompanying drawings.

BRIEF DESCRIPTION OF THE DRAWINGS

FIG. 8 shows a query string in accordance with an embodiment; and

DETAILED DESCRIPTION

Figure 1:
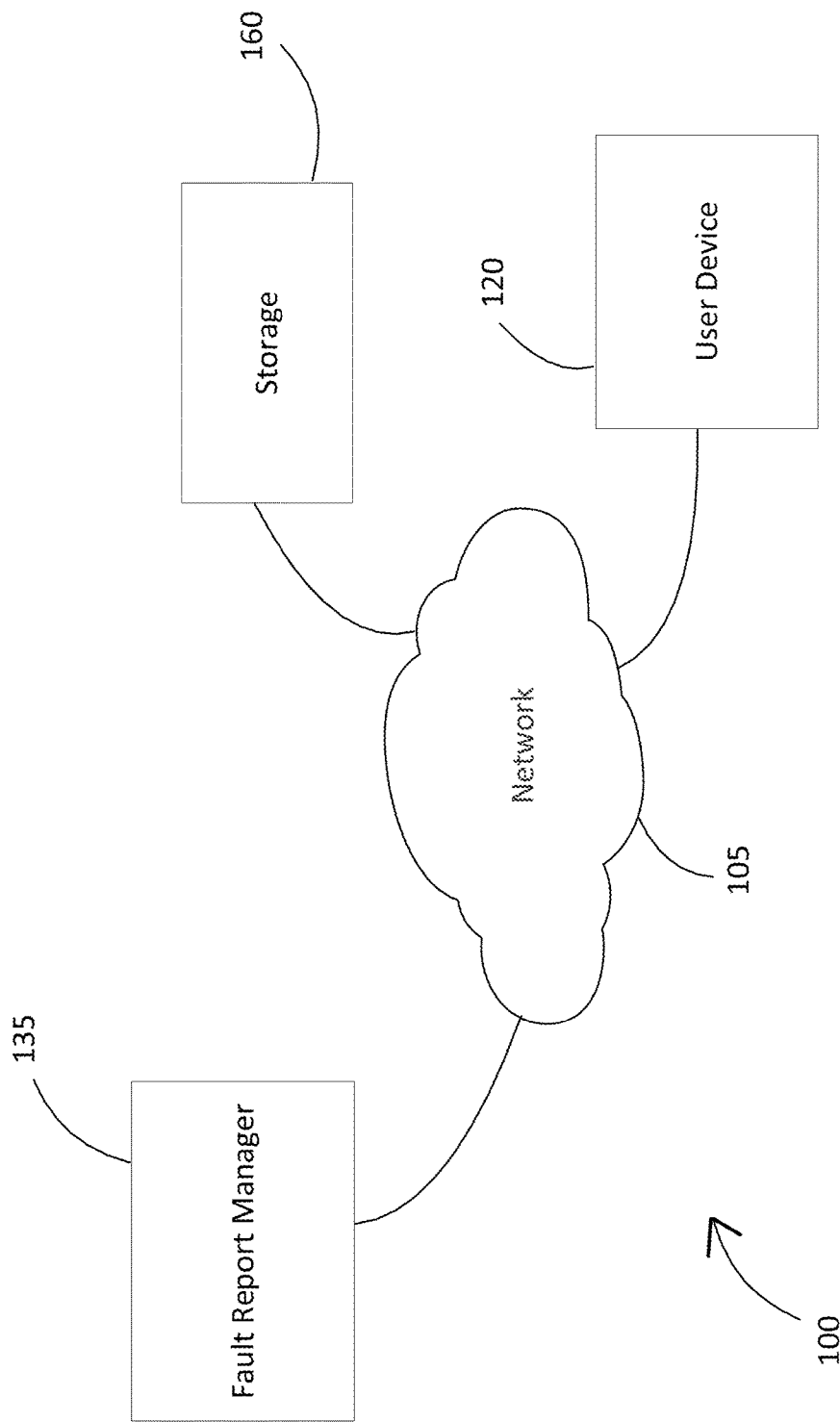
FIG. 1 shows a communication system in accordance with an embodiment.

Systems and methods for automatically classifying a query string are disclosed. In accordance with an embodiment, a plurality of object names and a query string are defined. A first set that includes a plurality of first query string-object name pairs is generated based on the plurality of object names and the query string. A closeness score is determined for each first query string-object name pair in the first set. A second set that includes a plurality of second query string-object name pairs is generated, wherein the second query string-object name pairs are selected from the first set based on the closeness scores. A measure of semantic similarity is determined for each second query string-object name pair in the second set. A third set of third query string-object name pairs is defined, wherein the third query string-object name pairs are selected from the second set based on the measures of semantic similarity. One or more of the query string-object name pairs in the third set may be selected as the final matching pairs.

Systems, apparatus, and method are described herein in the context of an illustrative embodiment in which a user sorts fault reports pertaining to components of a train. In the illustrative embodiment, a user, who owns or manages a plurality of trains, has a need to sort large numbers of fault reports submitted by operators of the trains. The user transmits selected portions of the fault reports (referred to as "query strings") to a fault report manager. The user also provides to the fault report manager a list of assets that includes names of various components of the trains. The fault report manager automatically matches each query string to a corresponding component name selected from the asset list.

In other embodiments, the systems, apparatus, and methods described herein may be equally applicable to other industries, in particular, industries in which a user may own or manage a large number of distributed assets. For example, systems, apparatus, and methods described herein may be used to classify or sort fault reports (or other messages) pertaining to other types of vehicles (e.g., motor vehicles such as trucks, airplanes, ships, etc.), mechanical devices in a commercial facility (compressors, turbines, or other machines), mechanical assets in an industrial facility (for example, in the mining or steel industries), or military assets (tanks, weapons, etc.).

Many techniques exist for matching a text message or word to a corresponding item in a list. A common approach is to compare the letters and characters in the message or word with the letters and characters in each item in the list, and identify the item that most closely matches the message or word. While these techniques show some success, they do not take the meaning of words into consideration and therefore fail in many cases and often are not useful when there is a need to interpret and classify messages containing human language.

The inventors have observed that combining a string matching technique with a semantic matching algorithm provides improved results and makes possible, for example, a system that is capable of automatically classifying or sorting messages by selecting, for each message, an item from a list that matches the message.

FIGS. 1-8 illustrate systems and methods that combines text matching and semantic matching to classify fault reports pertaining to a fleet of trains. However, the systems and methods described in the illustrative example may be applied to other industries and other fields.

FIG. 1 shows a communication system in accordance with an embodiment. Communication system 100 includes a network 105, a fault report manager 135, a storage 160, and a user device 120.

Network 105 may include any communications network adapted to transmit data. Network 105 may include an Internet, a local-area network (LAN), a wide-area network (WAN), an Ethernet, a Fiber channel network, a wireless network, or other type of network. Network 105 may include a combination of different types of networks.

Fault report manager 135 is adapted to automatically match a fault report to a corresponding component in a list. Fault report manager 135 may from time to time receive from user device 120 information defining various components of a vehicle. Fault report manager 135 may also from time to time receive from user device 120 one or more fault reports or portions of one or more fault reports. In one embodiment, fault report manager 135 may include software residing and operating on a computer, such as a server computer, personal computer, laptop device, cellphone, or other type of processing device. Fault report manager 135 is linked to network 105.

User device 120 may be any processing device such as a personal computer, a laptop computer, a tablet device, a workstation, etc. In one embodiment, user device 120 includes at least one processor (such as a central processing unit, or CPU), a memory, and an operating system, and is adapted to run one or more software programs or applications. User device 120 is linked to network 105. User device 120 may from time to time transmit information to fault report manager 135 via network 105.

Storage 160 is adapted to store data. For example, fault report manager 135 may from time to time store data in storage 160. Storage 160 may include one or more storage devices, such as one or more magnetic disks, internal hard disks and removable disks, magneto-optical disks, optical disks, etc. Storage 160 is linked to network 105.

Figure 2:
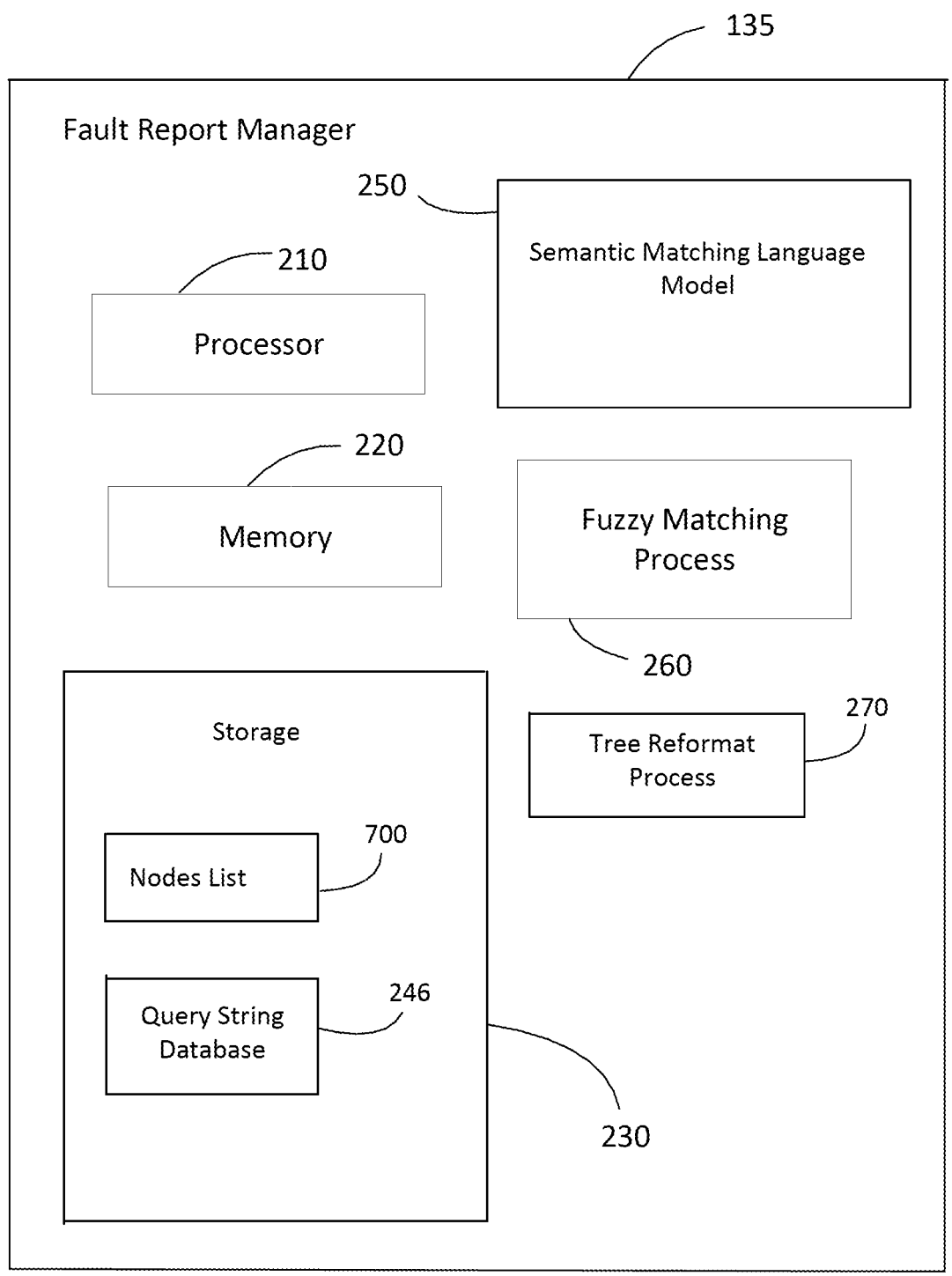
FIG. 2 shows components of a fault report manager in accordance with an embodiment.

FIG. 2 shows components of fault report manager 135 in accordance with an embodiment. Fault report manager 135 includes a processor 210, a memory 220, a storage 230, a semantic matching language model 250, a fuzzy matching process 260, and a tree reformat process 270.

Processor 210 controls operations of various components of fault report manager 135. Memory 220 is adapted to store data. For example, processor 210 may from time to time store data in memory 220.

Storage 230 is adapted to store data. For example, processor 210 may from time to time store data in storage 230.

Semantic matching language model 250 is adapted to generate a measure of semantic similarity between two words (or phrases). More particularly, semantic matching language model 250 is a machine learning model that is trained to identify, classify, infer, and/or predict similarities in meaning between words and phrases. Any suitable machine learning training technique may be used, including, but not limited to, a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and others suitable machine learning algorithms.

In one embodiment, semantic matching language model 250 includes the open-source Bidirectional Encoder Representations from Transformers (BERT) architecture published by Google AI. Other models may be used. For example, a model may be selected based on a user's needs, language preferences, etc.

In one embodiment, semantic matching language model 250 is trained on hundreds or thousands of labelled data sets. For example, training data may include a database of query statements and one or more asset lists. The data may be annotated by human operators to indicate an appropriate component and path for each query statement.

In accordance with an embodiment, semantic matching language model 250 examines two words or phrases, generates a vector representation for each of the two words or phrases, and compares the vector representations to predict a measure of similarity (of meaning) between the two words or phrases. The comparison between two vectors may be performed based on cosine similarity, for example. Other methods may be used.

Accordingly, semantic matching language model 250 may from time to time examine two words or phrases and predict a measure of similarity between the two words or phrases. Semantic matching language model 250 may examine a plurality of word pairs and generate a ranking of the word pairs based on their respective measures of similarity.

Fuzzy matching process 260 is adapted to determine a measure of closeness between the characters of two strings. Fuzzy matching process 260 uses one or more approximate string matching techniques to find strings that match a predetermined pattern approximately. Fuzzy matching process 260 examines the characters of a first string and the characters of a second string, and generates a closeness score indicating how close the two strings are. Methods of determining the closeness of a match are known. For example, the closeness of two strings may be determined based on the number of primitive that are necessary in order to convert the first string into an exact match of the second string. Other methods for determining closeness may be used.

Tree reformat process 270 is adapted to examine a list of objects organized in a hierarchical tree structure and modify or reformat the list as a simple list with no tree structure. For example, tree reformat process 270 may extract text strings from data organized in a tree structure and reorganize the strings as a simple list of strings.

In accordance with an embodiment, fault report manager 135 offers to a user an improved method for automatically sorting fault reports.

Figure 3:
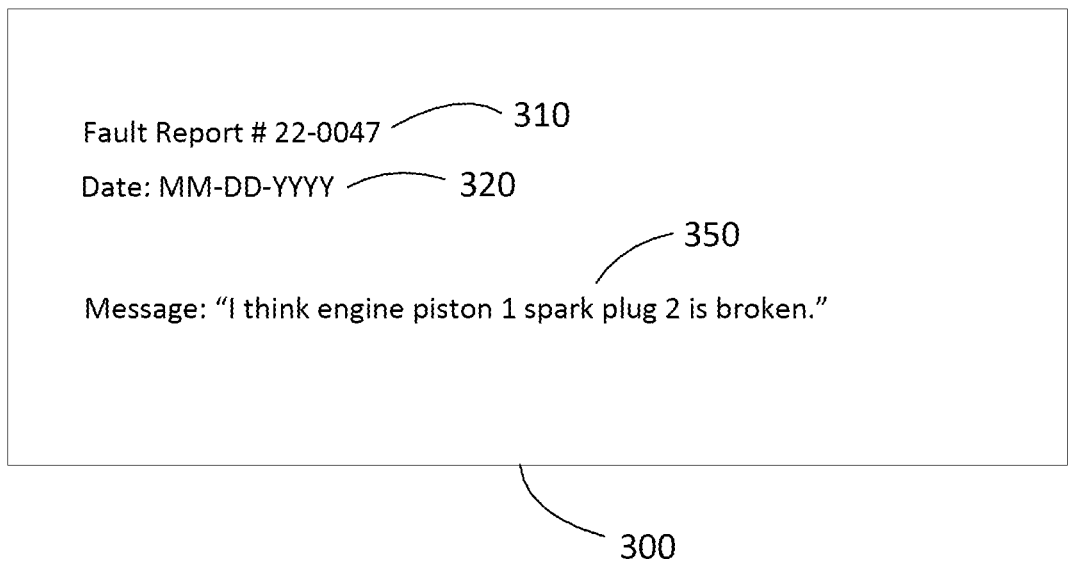
FIG. 3 shows an exemplary fault report.

FIG. 3 shows an exemplary fault report. Fault report 300 includes a fault report number 310, a date 320 indicating when the fault report was generated, and a message 350 produced by an operator and indicating a failure or other problem observed on a vehicle. Specifically, message 350 reads, "I think engine piston 1 spark plug 2 is broken." A fault report may have another format and may contain other types of information.

Figure 4:
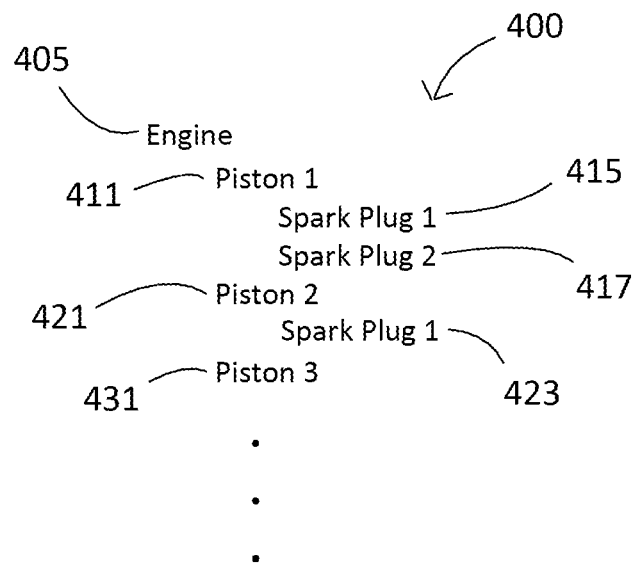
FIG. 4 shows a portion of an exemplary list of assets in accordance with an embodiment.

FIG. 4 shows a portion of an exemplary list of assets in accordance with an embodiment. List of assets 400 includes names of components including engine (405), piston 1 (411), piston 2 (421), piston 3 (431), and spark plug 1 (415), spark plug 2 (417), and spark plug 1 (423). The various component names are organized in a hierarchical tree structure which shows that pistons 1 (411), piston 2 (421) and piston 3 (431) are associated with engine (405), that spark plug 1 (415) and spark plug 2 (417) are associated with piston 1 (411), etc.

Typically, an employee assigned to match fault reports to the corresponding components on an asset list must manually find on the asset list the component name that matches the text in the report. In many cases, the asset list is contained in an asset tree that has thousands of nodes, and the employee must find and select the component path that corresponds to a reported issue. This process can be time consuming and costly.

In accordance with an embodiment, an improved method of automatically selecting a component path on an asset tree that corresponds to a reported issue is provided. The method uses both measures of character closeness and semantic similarity to match a query string with a corresponding component name on an asset list. Advantageously, automatically classifying a query string to identify a corresponding path on an asset tree using both measures of closeness and measures of semantic similarity provides improved results compared to existing systems and methods.

Figure 5:
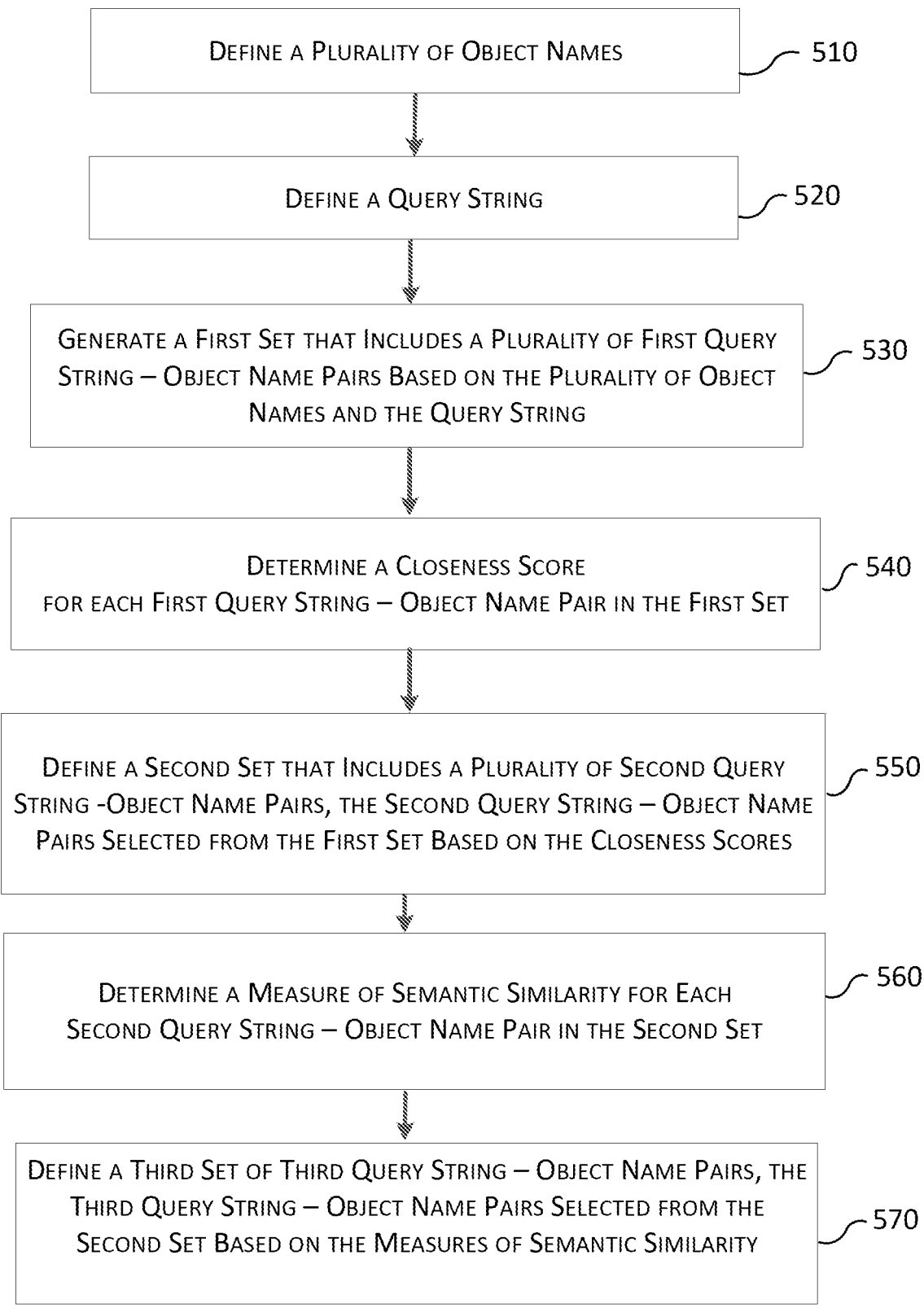
FIG. 5 is a flowchart of a method of automatically classifying query strings using measures of closeness and semantic similarity in accordance with an embodiment.

FIG. 5 is a flowchart of a method of automatically classifying query strings using measures of closeness and semantic similarity in accordance with an embodiment. The method of FIG. 5 may be used, for example, to match a fault report with a component on an asset list. At step 510, a plurality of object names is defined. The object names may be, for example, names of components of a vehicle. The object names may be contained in a list. At step 520, a query string is defined. The query string may include, for example, text extracted from a fault report. At step 530, a first set that includes a plurality of first query string-object name pairs is generated based on the plurality of object names and the query string. For example, the first set may include every possible query string-object name combination that may be generated based on the query string and the list of assets. At step 540, a closeness score is determined for each first query string-object name pair in the first set. The closeness score represents a measure of how close the characters and letters of the query string are to those of the object name. Any suitable method may be used to determine a closeness score. At step 550, a second set that includes a plurality of second query string-object name pairs is defined, wherein the second query string-object name pairs are selected from the first set based on the closeness scores. The pairs to be included in the second set may be selected by any suitable method. For example, all pairs having a closeness score above a predetermined level may be included in the second set. Alternatively, the N pairs having the highest closeness scores may be included in the second set. At step 560, a measure of semantic similarity is determined for each second query string-object name pair in the second set. The measure of semantic similarity indicates how close the query string and the object name are in meaning. Any suitable algorithm adapted to generate a measure of semantic similarity may be used. At step 570, a third set of third query string-object name pairs is defined, wherein the third query string-object name pairs are selected from the second set based on the measures of semantic similarity. The pairs to be included in the third set may be selected using any suitable method. For example, all pairs having a measure of semantic similarity above a predetermined level may be included in the third set. Alternatively, the N pairs having the N highest measures of semantic similarity may be included in the third set. One or more of the third query string-object name pairs in the third set may be selected as the resulting matches.

The method of FIG. 5 may be applied using any suitable methods for determining closeness scores and measures of semantic similarity. For example, in one embodiment, an approximate string matching technique may be used to determine closeness scores and a semantic matching language model may be used to determine measures of semantic similarity. In other embodiments, other methods may be used.

Figure 6A:
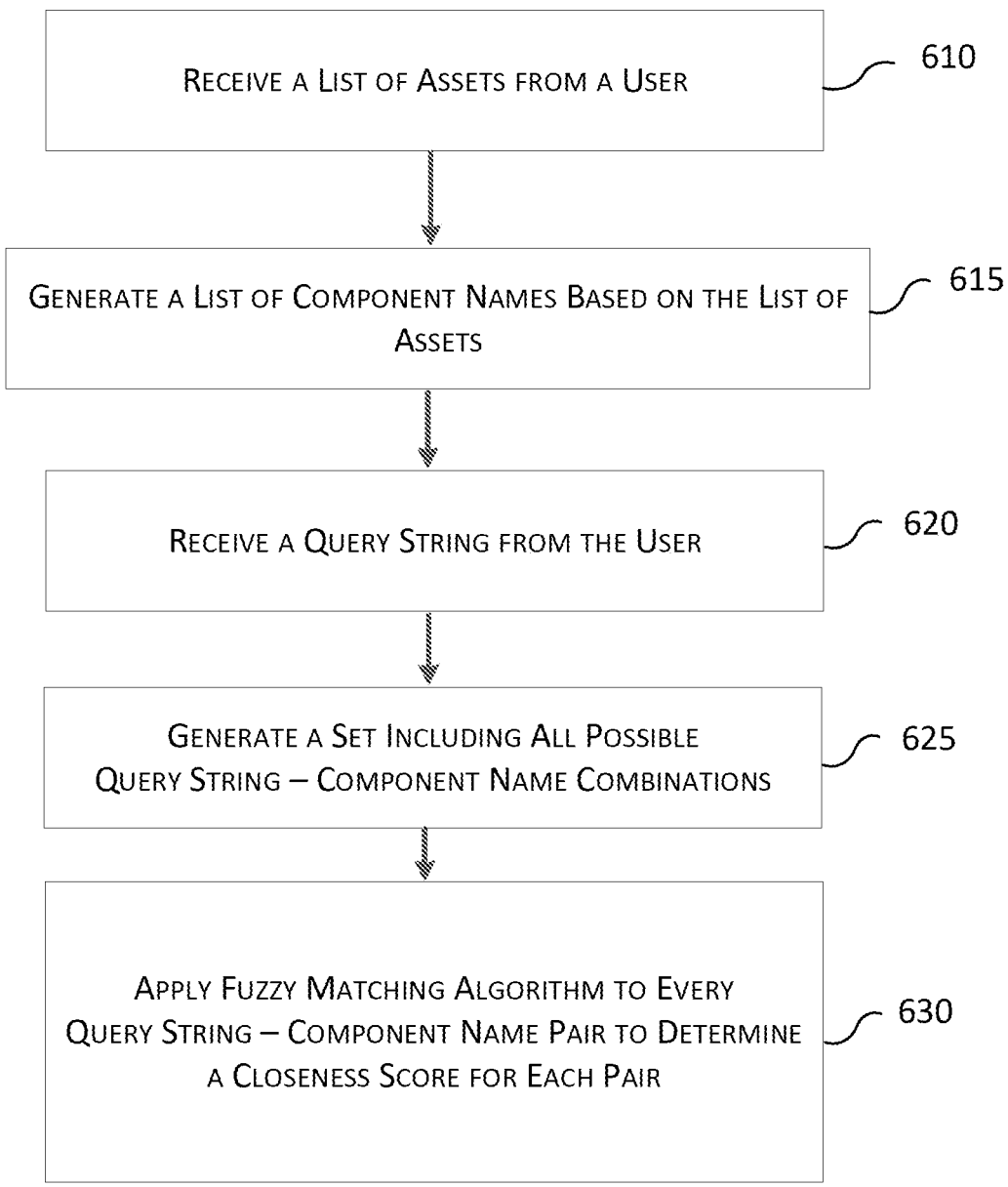
FIGS. 6A-6B include a flowchart of a method of automatically sorting query strings in accordance with an embodiment.
Figure 6B:
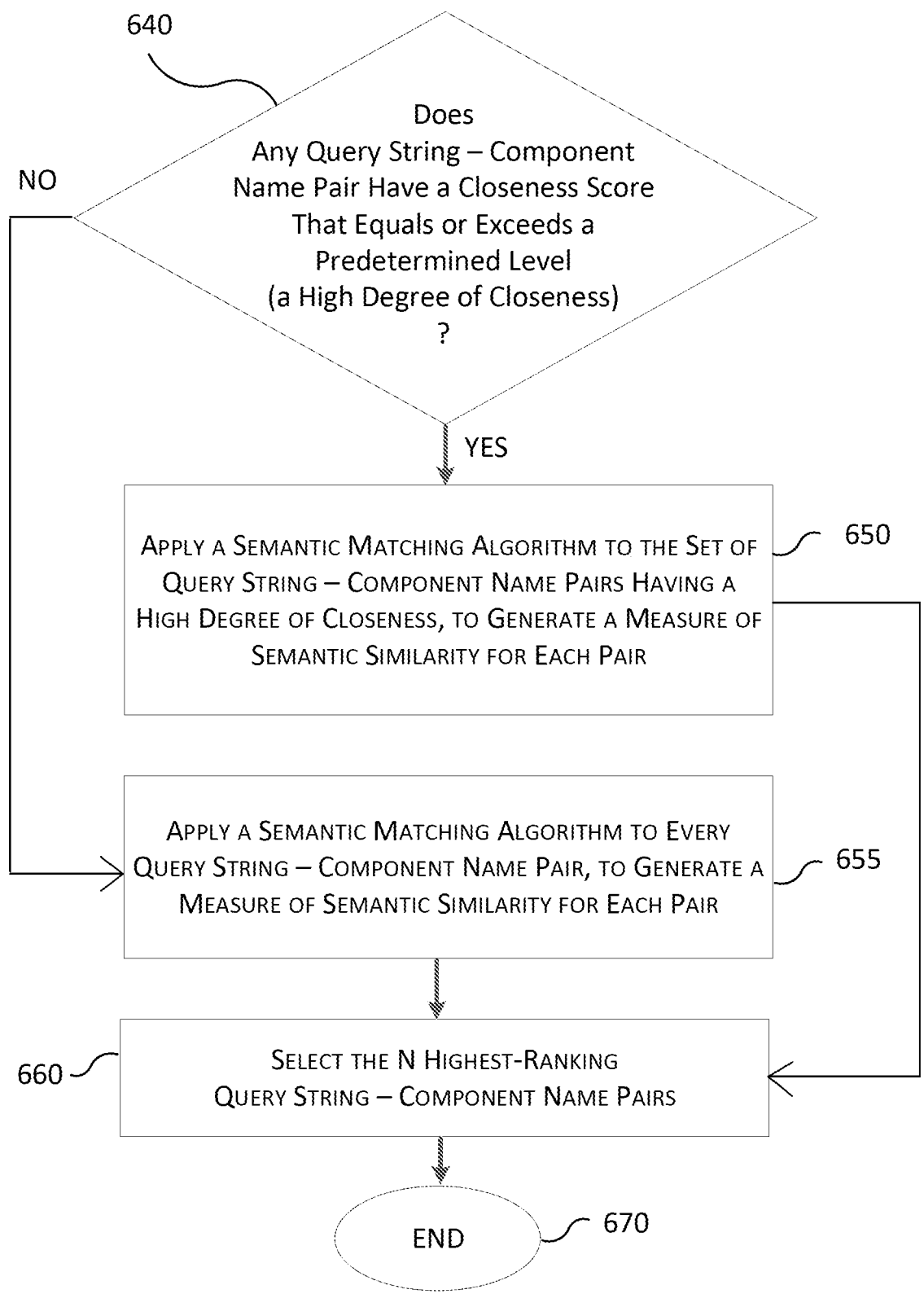

FIGS. 6A-6B include a flowchart of a method of automatically sorting query strings in accordance with an embodiment. FIGS. 6A-6B are discussed with reference to the illustrative embodiment of FIGS. 1-4. At step 610, a list of assets is received from a user. A list of assets may be, for example, a list of components of a vehicle or other mechanical device. The list may have any format. In the illustrative embodiment, the list of assets has a hierarchical tree structure that may include a plurality of nodes and a plurality of leaves. Suppose, for example, that a user provides list 400 (shown in FIG. 4) to fault report manager 135. Fault report manager 135 receives list 400 and may, for example, store the list in memory 220 or in storage 230.

Figure 7:
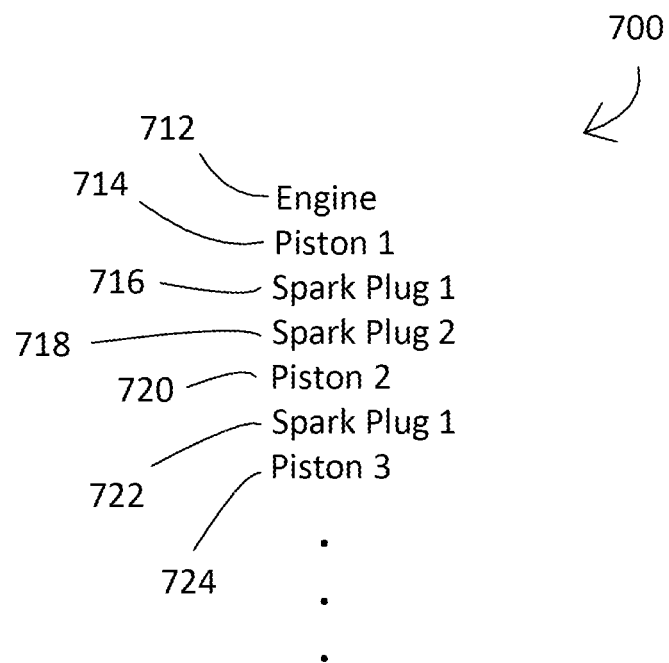
FIG. 7 shows a list of component names in accordance with an embodiment.

At step 615, a list of component names is generated based on the list of assets. In the illustrative embodiment of FIG. 2, tree reformat process 270 accesses list 400 and modifies or reformats the list by removing the hierarchical tree structure and generating a simple list of component names. The resulting list of component names (referred to as "nodes list 700") is shown in FIG. 7. Nodes list 700 includes a list of the component names extracted from list 400. Thus nodes list 700 includes component names "Engine" (712), "Piston 1" (714), "Spark plug 1" (716), "Spark plug 2" (718), "Piston 2" (720), "Spark plug 1" (722), "Piston 3" (724), etc., without any hierarchical tree structure. Referring to FIG. 2, processor 210 stores nodes list 700 in storage 230.

At step 620, a query string is received from a user. In the illustrative embodiment, the user provides a query string. Alternatively, processor 210 may extract a query string from a fault report received from the user. A query string may be a block of text of a selected length. In one embodiment, a query string may be a plain Unicode string. For example, a query string may be string of characters between 20 and 500 characters in length that describes a mechanical issue pertaining to a component of an asset. Referring to FIG. 3, for example, the user may examine fault report 300 (shown in FIG. 3), extract the text of message 350, and generate the query string shown in FIG. 8. Query string 800 includes the words, "I think engine piston 1 spark plug 2 is broken."

In the illustrative embodiment, processor 210 of fault report manager 135 stores query strings, including query string 800, in query string database 246 within storage 230.

In various embodiments, a user may provide a single query string, or a plurality of query strings (extracted from a plurality of fault reports) to fault report manager 135.

Fault report manager 135 now proceeds to compare the query string to the component names in the nodes list 700.

At step 625, a set of all possible query string-component name combinations is generated. Processor 210 accesses nodes list 700 and generates a set of all possible query string-component name combinations. For example, processor 210 may generate a plurality of query string-component name combinations including the following: query string 800 and "Engine" (712), query string 800 and "Piston 1" (714), query string 800 and "Spark Plug 1" (716), query string 800 and "Spark Plug 2" (718), etc.

At step 630, a fuzzy matching algorithm is applied to every query string-component name pair to determine a closeness score for each pair. In the illustrative embodiment, fuzzy matching process 260 examines every query string-component name pair and determines a closeness score for each pair. For example, fuzzy matching process 260 compares query string 800 to component name "Engine" (712), then compares query string 800 to component name "Piston 1" (714), then compares query string 800 to component name "Spark Plug 1" (716), etc. Fuzzy matching process 260 generates a closeness score for each pair.

Referring now to block 640 (of FIG. 6B), if any query string-component name pair has a closeness score that equals or exceeds a predetermined level (indicating a high level of closeness), then the routine proceeds to step 650. If no query string-component name pair has a closeness score that equals or exceeds the predetermined level, then the routine proceeds to step 655.

Supposing, for example, that the pairs formed from query string 800 and the component names "Engine" (712), "Piston 1" (714), and "Spark Plug 2" (718) produce query string-component name pairs that have a high level of closeness, the routine proceeds to step 650.

At step 650, a semantic matching algorithm is applied to the set of query string-component name pairs having a high degree of closeness, to generate a measure of semantic similarity for each pair. In the illustrative embodiment, semantic matching language model 250 examines the query string-component name pairs that have a high degree of closeness (including those that include query string 800 and components "Engine" (712), "Piston 1" (714), and "Spark Plug 2" (718)), and determines a measure of semantic similarity for each pair. Semantic matching learning model 250 may determine that the query string-component name pair that includes query string 800 and component name "Spark Plug 2" (718) has the highest measure of similarity, that the query string-component name pair that includes query string 800 and component name "Piston 1" (714) has the second-highest measure of similarity, and that the query string-component name pair that includes query string 800 and component name "Engine" (712) has the third-highest measure of similarity. The routine now proceeds to step 660.

At step 655 (performed if no pair has a high level of closeness), the semantic matching algorithm is applied to every possible query string-component name pair, to generate a measure of semantic similarity for each pair. Thus, semantic matching language model 250 examines every possible query string-component name pair, and determines a measure of semantic similarity for each pair. The routine then proceeds to step 660.

At step 660, the N highest-ranking query string-component name pairs (based on the measures of semantic similarity) are selected. Supposing, for example, that N=2, semantic matching language model 250 may select the query string-component name pair that includes query string 800 and component name "Spark Plug 2' (718) and the query string-component name pair that includes query string 800 and component name "Piston 1" (714).

The routine now proceeds to block 670 and ends.

In one embodiment, the selected pairs are presented to the user. For example, fault report manager 135 may transmit the highest-ranking query string-component name pairs to user device 120, or may make the selected pairs available to user device 120 on a web page, for example. In another embodiment, fault report manager 135 may only provide the component names from the highest-ranking query string-component name pairs.

In another embodiment, fault report manager 135 selects a single component name as a match for the query string from the N highest-ranking query string-component name pairs. For example, the component name from the highest-ranking query string-component name pair (based on the measures of semantic similarity) may be selected. In the illustrative embodiment, fault manager 135 may present the component name "Spark Plug 2" to the user. Fault report manager 135 may also provide to the user the path in the tree structure associated with the component name ("Engine Piston 1 Spark Plug 2").

In accordance with another embodiment, fault report manager 135 may function within a system that provides additional services to a user. For example, fault manager 135 may function as part of a system that provides inventory management services to a user. Specifically, after fault report manager 135 identifies a component of a mechanical device that has experienced a mechanical problem, the system may automatically order a replacement part for the component. The system may also provide other services based on the components identified by fault report manager 135, such as automatically scheduling maintenance and repair work, providing reliability reports, etc. For example, the system may calculate an average time between instances when a particular component appears in a fault report and use this data to generate other types of information for a user. For example, the system may report to the user an expected useful life of the component. The system may predict or calculate replacement material usage, compare failure rates between parts provided by different suppliers, etc. This type of information may advantageously help a user to identify a cost effective maintenance strategy.

In accordance with another embodiment, semantic matching is applied only if no query string-component name has a sufficiently high closeness score. If one or more query string-component name pairs have a sufficiently high closeness score, semantic matching is not used.

In another embodiment, a string of text received from a user may be cleaned to define a query string. For example, a string of text extracted from a fault report may be cleaned to define a query string. One or more string cleaning techniques may be used.

Figure 6C:
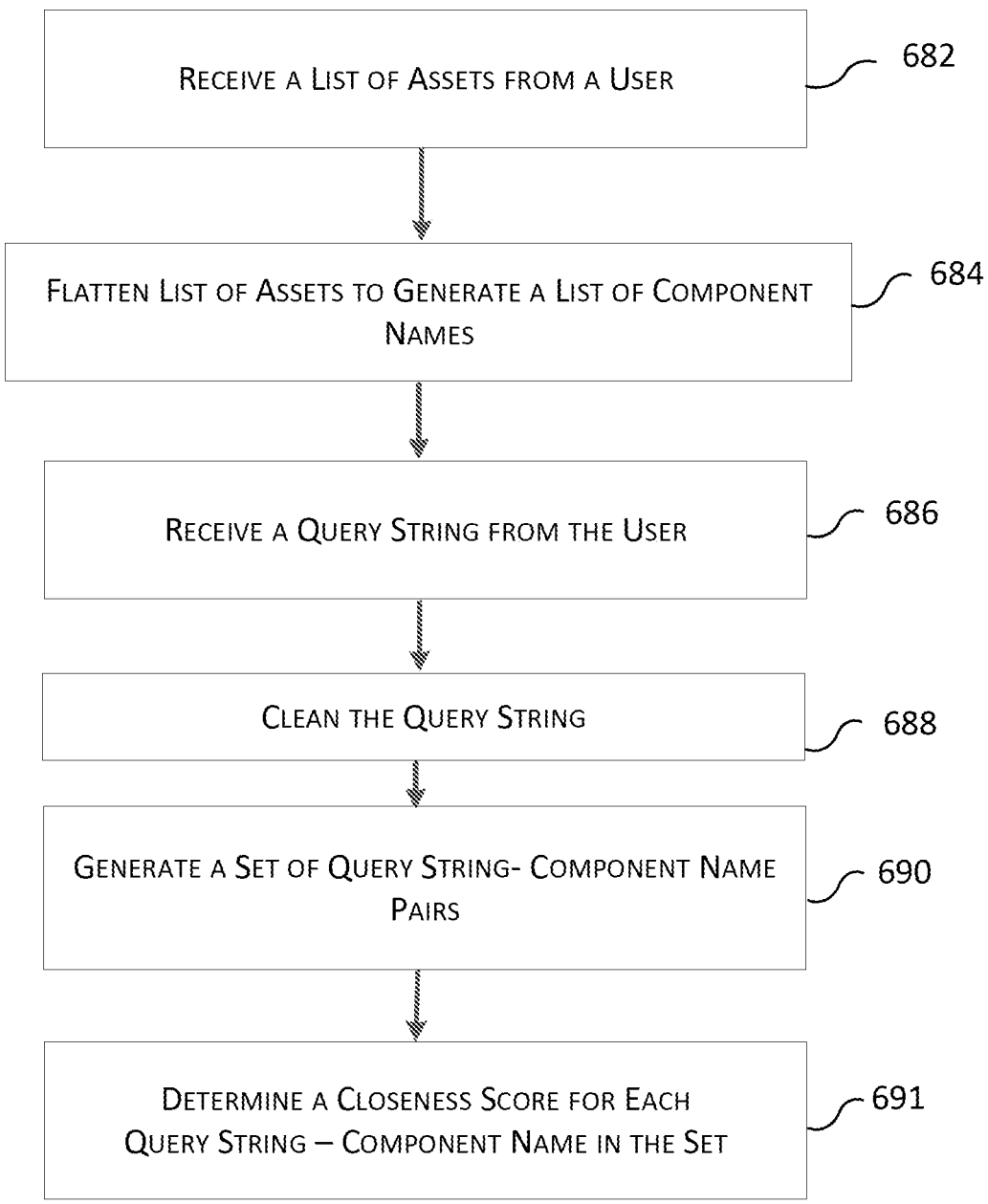
FIGS. 6C-6D include a flowchart of a method of automatically sorting query strings in accordance with another embodiment.
Figure 6D:
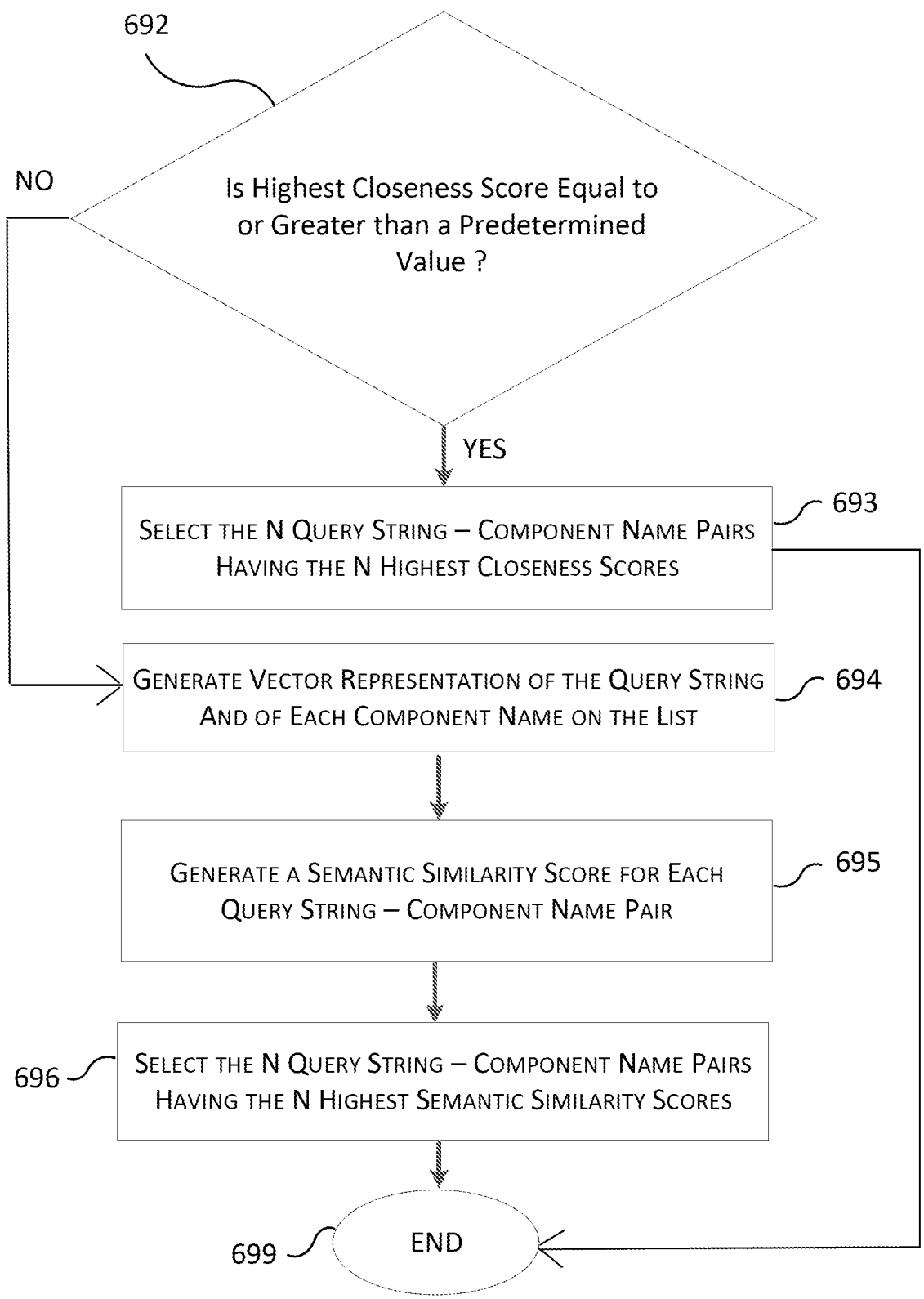

FIGS. 6C-6D include a flowchart of a method in accordance with another embodiment. At step 682, a list of assets is received from a user. For example, an asset tree containing a plurality of component names within a hierarchical structure may be received from a user.

At step 684, the list of assets is flattened to generate a list of component names. Any suitable flattening method may be used. In one embodiment, a path-wide flattening method is used. For example, a path of an asset tree may be flattened to produce "Root", "Root>>A", "Root>>A>>B", "Root>>A>>B>>C," etc. In another embodiment, a node-wise flattening method is used. For example, a node-wise flattening method may produce "Root", "A", "B", "C", "D", "E," etc. Other flattening methods may be used. A list containing the component names in the flattened tree is generated.

At step 686, a query string is received from the user. For example, the user may provide a query string extracted from a fault report. Alternatively, the user may provide a fault report, and a query string may be obtained from the fault report.

At step 688, the query string is cleaned. Any suitable query cleaning method may be used. For example, a query cleaning method may include any one or more of the following actions: removing all special characters and numbers (including, without limitation: '[-( ).;",/]+'), removing all numbers (0, 1, 2, 3, 4, etc.), converting all characters to lower case, lemmatization (e.g., broken, breaking, break-→break), and stemming (e.g., traditional, tradition→trad). A query cleaning method may include other actions.

Thus, for example, a string of text (extracted from a fault report) may be received from a user, and the string of text may be cleaned using one or more string cleaning techniques.

At step 690, a set of query string-component name pairs is generated. For example, a set of query string-component name pairs may be generated by pairing the query string with each component name on the list.

At step 691, a closeness score is determined for each query string-component name pair in the set. In the illustrative embodiment, fuzzy matching process 260 applies a fuzzy matching algorithm to each query string-component name pair in the set to determine a respective closeness score for each query string-component name pair.

Processor 210 now examines the highest closeness scores determined. Referring to block 692, if the highest closeness score determined is equal to or greater than a predetermined value, then the routine proceeds to step 693. If no query string-component name pair has a closeness score equal to or greater than the predetermined value, then the routine proceeds to step 694.

At step 693, the N query string-component name pairs having the N-highest closeness scores are selected. Processor 210 may present the N highest-scoring pairs to the user as matching pairs. Alternatively, only the components of the selected pairs may be presented to the user. The routine then proceeds to block 699 and ends.

If no query string-component name pair has a sufficiently high closeness score, then at step 694, vector representations are generated for the query string and for each component name in the list. In the illustrative embodiment, semantic matching language model 250 generates vector representations for the query string and for each component name in the list.

At step 695, a semantic similarity score is generated for each query string-component name pair. In one embodiment, semantic matching language model 250 may use a cosine similarity method to generate semantic similarity scores. Other methods may be used.

At step 696, the N query string-component name pairs having the N highest semantic similarity scores are selected. These N highest-scoring pairs may be presented to the user. Alternatively, only the component names of the selected pairs may be presented to the user. The routine then proceeds to block 699 and ends.

In various embodiments, the method steps described herein, including those of FIG. 5, FIGS. 6A-6B, and FIGS. 6C-6D, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
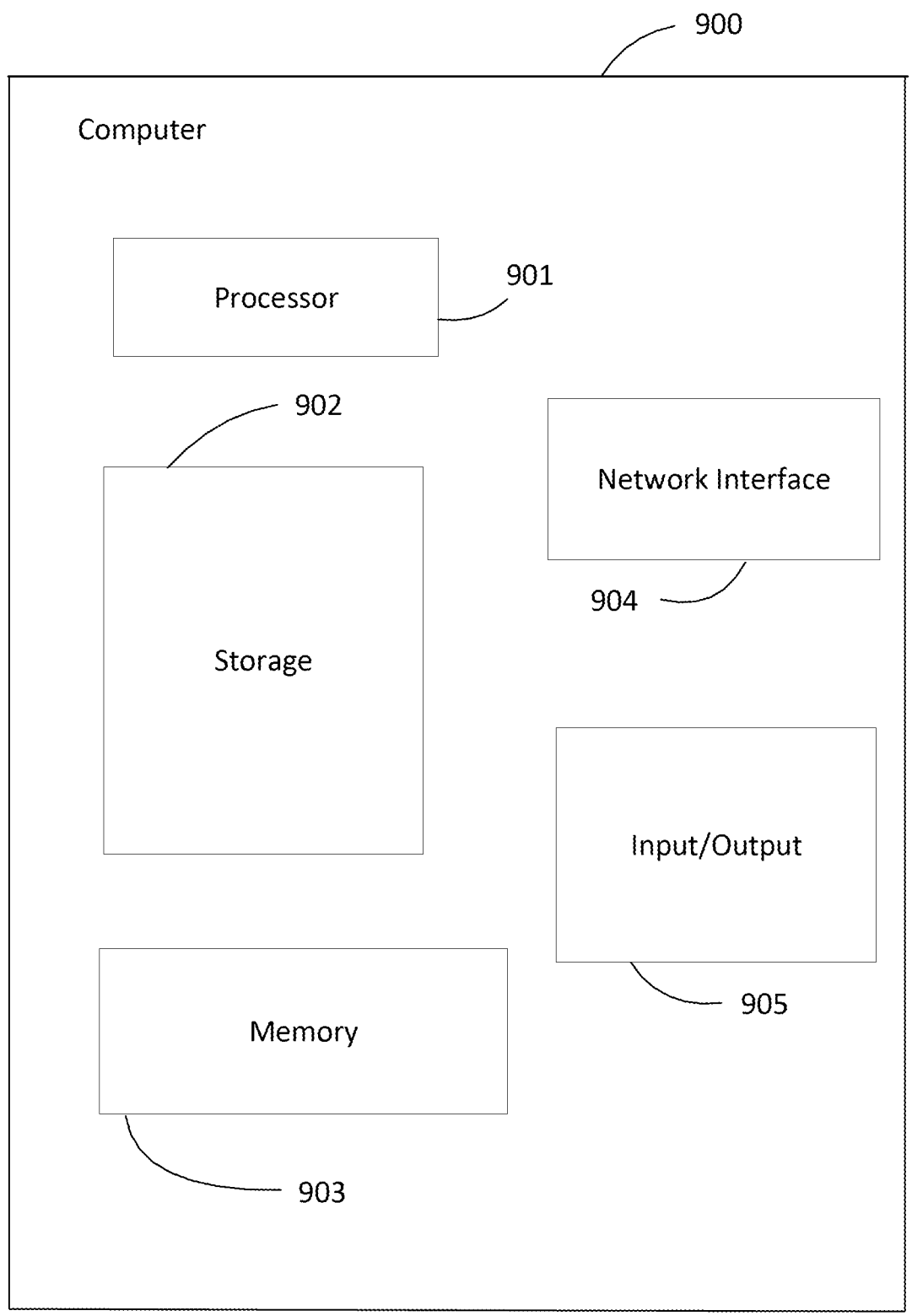
FIG. 9 is a high-level block diagram of an exemplary computer that may be used to implement systems, apparatus and methods described herein.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps described herein, including the methods steps described in FIG. 5, FIGS. 6A-6B, and FIGS. 6C-6D, can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps described herein. Accordingly, by executing the computer program instructions, the processor 901 executes an algorithm defined by the method steps described herein. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate arrays (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, smartphone, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, and components thereof, may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
defining a plurality of object names;
defining a query string;
generating a first set that includes a plurality of first query string-object name pairs based on the plurality of object names and the query string;
determining a closeness score for each first query string-object name pair in the first set, wherein determining the closeness score comprises: applying to each query string-object name pair in the first set an approximate string matching technique to generate a respective closeness score for the respective query string-object name pair;
defining a second set that includes a plurality of second query string-object name pairs, the second query string-object name pairs selected from the first set based on the closeness scores determined, wherein defining the second set comprises: including in the second set all query string-object name pairs having a closeness score that equals or exceeds a predetermined level;
determining a measure of semantic similarity for each second query string-object name pair in the second set, wherein determining the measure of semantic similarity comprises: applying to each query string-object name pair in the second set a semantic matching language model to generate a measure of semantic similarity for the respective query string-object name pair; and
defining a third set of third query string-object name pairs, the third query string-object name pairs selected from the second set based on the measures of semantic similarity determined, wherein defining the third set of third query string-object name pairs comprises: ranking the query string-object name pairs in the second set based on measures of semantic similarity; and
selecting a number of highest-ranked query string-object name pairs.

2. The method of claim 1, wherein each object name is a name of a component of a mechanical asset.

3. The method of claim 1, wherein defining a plurality of object names further comprises:
receiving a list of assets comprising the plurality of asset names organized in a tree structure; and
modifying the list of assets to generate a list comprising the plurality of object names without the tree structure.

4. The method of claim 1, wherein defining a query string further comprises:
receiving a string of text from a user; and
cleaning the string of text.

5. The method of claim 1, wherein generating a first set that includes a plurality of first query string-object name pairs further comprises:
generating a first set comprising all possible query string-object name combinations based on the plurality of object names and the query string.

6. The method of claim 1, wherein the semantic matching language model includes a language model based on the open-source Bidirectional Encoder Representations from Transformers (BERT) architecture published by Google AI.

7. A non-transitory computer readable medium having stored thereon software instructions that, when executed by a processor, cause the processor to perform a series of operations comprising:
defining a plurality of object names;
defining a query string;
generating a first set that includes a plurality of first query string-object name pairs based on the plurality of object names and the query string;
determining a closeness score for each first query string-object name pair in the first set, wherein determining the closeness score comprises: applying to each query string-object name pair in the first set an approximate string matching technique to generate a respective closeness score for the respective query string-object name pair;
defining a second set that includes a plurality of second query string-object name pairs, the second query string-object name pairs selected from the first set based on the closeness scores determined, wherein defining the second set comprises: including in the second set all query string-object name pairs having a closeness score that equals or exceeds a predetermined level;
determining a measure of semantic similarity for each second query string-object name pair in the second set, wherein determining the measure of semantic similarity comprises: applying to each query string-object name pair in the second set a semantic matching language model to generate a measure of semantic similarity for the respective query string-object name pair; and
defining a third set of third query string-object name pairs, the third query string-object name pairs selected from the second set based on the measures of semantic similarity determined, wherein defining the third set of third query string-object name pairs comprises: ranking the query string-object name pairs in the second set based on measures of semantic similarity; and
selecting a number of highest-ranked query string-object name pairs.

8. The non-transitory computer readable medium of claim 7, wherein each object name is a name of a component of a mechanical asset.

9. The non-transitory computer readable medium of claim 7, wherein defining a plurality of object names further comprises:
receiving a list of assets comprising the plurality of asset names organized in a tree structure; and
modifying the list of assets to generate a list comprising the plurality of object names without the tree structure.

10. The non-transitory computer readable medium of claim 7, wherein defining a query string further comprises:
receiving a string of text from a user; and
cleaning the string of text.

11. The non-transitory computer readable medium of claim 7, wherein generating a first set that includes a plurality of first query string-object name pairs further comprises:
generating a first set comprising all possible query string-object name combinations based on the plurality of object names and the query string.

12. The non-transitory computer readable medium of claim 7, wherein the semantic matching language model includes a language model based on the open-source Bidirectional Encoder Representations from Transformers (BERT) architecture published by Google AI.

13. A system comprising one or more processors, and a non-transitory computer-readable medium including one or more sequences of instructions that, when executed by the one or more processors, cause the system to perform operations comprising:

defining a plurality of object names;
defining a query string;
generating a first set that includes a plurality of first query string-object name pairs based on the plurality of object names and the query string;
determining a closeness score for each first query string-object name pair in the first set, wherein determining the closeness score comprises: applying to each query string-object name pair in the first set an approximate string matching technique to generate a respective closeness score for the respective query string-object name pair;
defining a second set that includes a plurality of second query string-object name pairs, the second query string-object name pairs selected from the first set based on the closeness scores determined, wherein defining the second set comprises: including in the second set all query string-object name pairs having a closeness score that equals or exceeds a predetermined level;
determining a measure of semantic similarity for each second query string-object name pair in the second set, wherein determining the measure of semantic similarity comprises: applying to each query string-object name pair in the second set a semantic matching language model to generate a measure of semantic similarity for the respective query string-object name pair; and
defining a third set of third query string-object name pairs, the third query string-object name pairs selected from the second set based on the measures of semantic similarity determined, wherein defining the third set of third query string-object name pairs comprises: ranking the query string-object name pairs in the second set based on measures of semantic similarity; and
selecting a number of highest-ranked query string-object name pairs.

* * * * *